(12) United States Patent
Durrett

(10) Patent No.: US 8,434,450 B2
(45) Date of Patent: May 7, 2013

(54) METHOD FOR OPERATING A DIRECT-INJECTION SPARK-ASSISTED COMPRESSION-IGNITION ENGINE

(75) Inventor: Russell P. Durrett, Bloomfield Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 637 days.

(21) Appl. No.: 12/694,352

(22) Filed: Jan. 27, 2010

(65) Prior Publication Data

US 2011/0180035 A1 Jul. 28, 2011

(51) Int. Cl.
- *F02B 3/04* (2006.01)
- *F02B 3/08* (2006.01)

(52) U.S. Cl.
USPC ............. 123/299; 123/295; 123/305

(58) Field of Classification Search ........ 123/295, 123/299, 305
See application file for complete search history.

(56) References Cited

U.S. PATENT DOCUMENTS

| | | | |
|---|---|---|---|
| 6,230,683 B1 | 5/2001 | Zur Loye et al. | |
| 6,267,097 B1 | 7/2001 | Urushihara et al. | |
| 6,293,246 B1 * | 9/2001 | Tanahashi et al. | 123/305 |
| 6,637,393 B2 | 10/2003 | Sutherland | |
| 6,684,849 B2 | 2/2004 | zur Loye et al. | |
| 6,915,776 B2 | 7/2005 | Zur Loye et al. | |
| 6,971,365 B1 | 12/2005 | Najt et al. | |
| 7,121,254 B2 | 10/2006 | Wickman et al. | |
| 7,128,047 B2 | 10/2006 | Kuo et al. | |
| 7,258,086 B2 | 8/2007 | Fitzgerald | |
| 7,370,633 B2 * | 5/2008 | Kang et al. | 123/305 |
| 7,469,672 B2 * | 12/2008 | Andri | 123/198 F |
| 7,793,637 B2 * | 9/2010 | Strom et al. | 123/304 |
| 7,832,370 B2 * | 11/2010 | Sutherland et al. | 123/143 A |
| 7,874,280 B2 * | 1/2011 | Kuzuyama | 123/430 |
| 2006/0196466 A1 * | 9/2006 | Kuo et al. | 123/295 |
| 2007/0119417 A1 * | 5/2007 | Eng et al. | 123/305 |
| 2008/0271436 A1 * | 11/2008 | Najt et al. | 60/285 |
| 2009/0272363 A1 * | 11/2009 | Yun et al. | 123/295 |

OTHER PUBLICATIONS

Enright, Berhard. "A Critical Review of Spark Ignited Diesel Combustion" SAE Paper 0148-7191/88/0912-1317 (1988).

* cited by examiner

*Primary Examiner* — Erick Solis

(57) ABSTRACT

A compression-ignition internal combustion engine includes a plurality of combustion chambers operating in a four-stroke combustion cycle and is configured to operate at a geometric compression ratio greater than 10:1. A method for operating a the engine includes forming a fuel/air charge by injecting fuel into each combustion chamber during a compression stroke, wherein the injection is completed prior to any combustion within the combustion chamber. The method further includes operating the engine to manage temperature of the fuel/air charge in the combustion chamber below an auto-ignition point of the fuel/air charge, and providing a spark discharge in the combustion chamber subsequent to injecting the fuel and in advance of the fuel/air charge achieving an auto-ignition temperature.

16 Claims, 3 Drawing Sheets

METHOD FOR OPERATING A DIRECT-INJECTION SPARK-ASSISTED COMPRESSION-IGNITION ENGINE

TECHNICAL FIELD

This disclosure is related to direct-injection compression-ignition internal combustion engines.

BACKGROUND

The statements in this section merely provide background information related to the present disclosure and may not constitute prior art.

Internal combustion engines can include spark-ignition and compression-ignition engines. Known spark-ignited engines operate by introducing a mixture of air and fuel into a combustion chamber of the engine. A piston compresses this mixture, and at predetermined crankshaft angle, a spark plug ignites the fuel and air mixture producing a flame front that propagates through the combustion chamber. The rapid increase in heat from the burned fuel triggers an increase in pressure which forces the piston downward. The use of a spark plug allows precisely timed combustion events. The compression ratio of the engine is kept to relatively low to avoid spark knock. Spark knock occurs when the fuel and air mixture auto-ignites prior to spark ignition and may cause engine damage. Consequently, spark-ignited engines are designed with geometric compression ratios between 8:1 and 11:1.

The compression-ignition engine operates at relatively high geometric compression ratios in a range of 15:1 and 22:1 and greater in particular embodiments. Higher compression ratios increase the thermal efficiency of the compression-ignited engine. The compression ignition engine operates by introducing unthrottled air into the combustion chamber, thereby increasing the efficiency by decreasing pumping losses. In a compression-ignited engine, the ignition timing is controlled by the injection of fuel into the combustion chamber near the end of the compression stroke when the trapped air within the combustion chamber is at or above an auto-ignition temperature for the fuel. The heat release of the combustion process causes an increase in in-cylinder pressure forcing the piston downward in the same manner as the spark-ignited engine.

The compression ignition engine produces emissions including particulate matter and oxides of nitrogen (NOx). Particulate matter is formed by combustion of locally rich air/fuel mixtures within the combustion chamber. These rich areas occur due to the non-homogeneity of the fuel/air charge caused by incomplete premixing of the fuel and air at ignition. Known aftertreatment devices for reducing particulate matter include particulate filters. Particulate filters trap particulate matter and are periodically purged during high temperature regeneration events.

The formation of oxides of nitrogen is a function of combustion chemistry. The compression-ignited engine produces relatively high NOx emissions in the exhaust stream after combustion of the air/fuel mixture at relatively high temperatures. Known aftertreatment systems for NOx reduction have included converter systems such as a selective catalyst reduction (SCR) device for engines operating with lean air/fuel ratios. The SCR device includes a catalyst that promotes the reaction of NOx with a reductant, such as ammonia or urea, to produce nitrogen and water. The reductants may be injected into an exhaust gas feedstream upstream of the SCR device, requiring an injection system, a reductant source and a control scheme. Additionally, engine operation may use a three-way catalyst (TWC) to produce ammonia for use as a reductant. Lower compression ratios may decrease combustion temperature thereby decreasing NOx emissions but may decrease combustion efficiency and increase engine starting difficulties at relatively cold temperatures.

One embodiment of a compression-ignition engine may include operating the engine in a premixed-charge compression-ignition (PCCI) combustion mode. The PCCI combustion mode incorporates a compression-ignition combustion system with high flow rates of cooled exhaust gas recirculation (EGR) and an early start of injection (SOI) timing. Combining a high EGR rate and an early SOI results in a long ignition delay period prior to the start of combustion (SOC). The ignition delay period exceeds the fuel injection duration during PCCI combustion resulting in a premixed combustion event at the SOC. Adequate premixing of the fuel and air, along with a high EGR flow rate, reduces the formation of locally rich regions that contribute to particulate matter formation. The high EGR rate acts as a charge diluent that suppresses the temperature of combustion below that at which significant amounts of NOx are formed.

The PCCI combustion mode is effective at relatively low engine speeds and loads where the amount of fuel injected is relatively low and the time available for premixing is relatively long. As the engine load increases, the amount of heat released in the rapid premixed burning process becomes large enough to create excessive combustion noise. This occurs even if there is sufficient premixing of the fuel and air during the ignition delay period. Excessive combustion noise is objectionable to consumers. Consequently, PCCI combustion has been limited to relatively low engine loads.

SUMMARY

A compression-ignition internal combustion engine includes a plurality of combustion chambers operating in a four-stroke combustion cycle and is configured to operate at a geometric compression ratio greater than 10:1. A method for operating a the engine includes forming a fuel/air charge by injecting fuel into each combustion chamber during a compression stroke, wherein the injection is completed prior to any combustion within the combustion chamber. The method further includes operating the engine to manage temperature of the fuel/air charge in the combustion chamber below an auto-ignition point of the fuel/air charge, and providing a spark discharge in the combustion chamber subsequent to injecting the fuel and in advance of the fuel/air charge achieving an auto-ignition temperature.

BRIEF DESCRIPTION OF THE DRAWINGS

One or more embodiments will now be described, by way of example, with reference to the accompanying drawings, in which.

DETAILED DESCRIPTION

Figure 1:
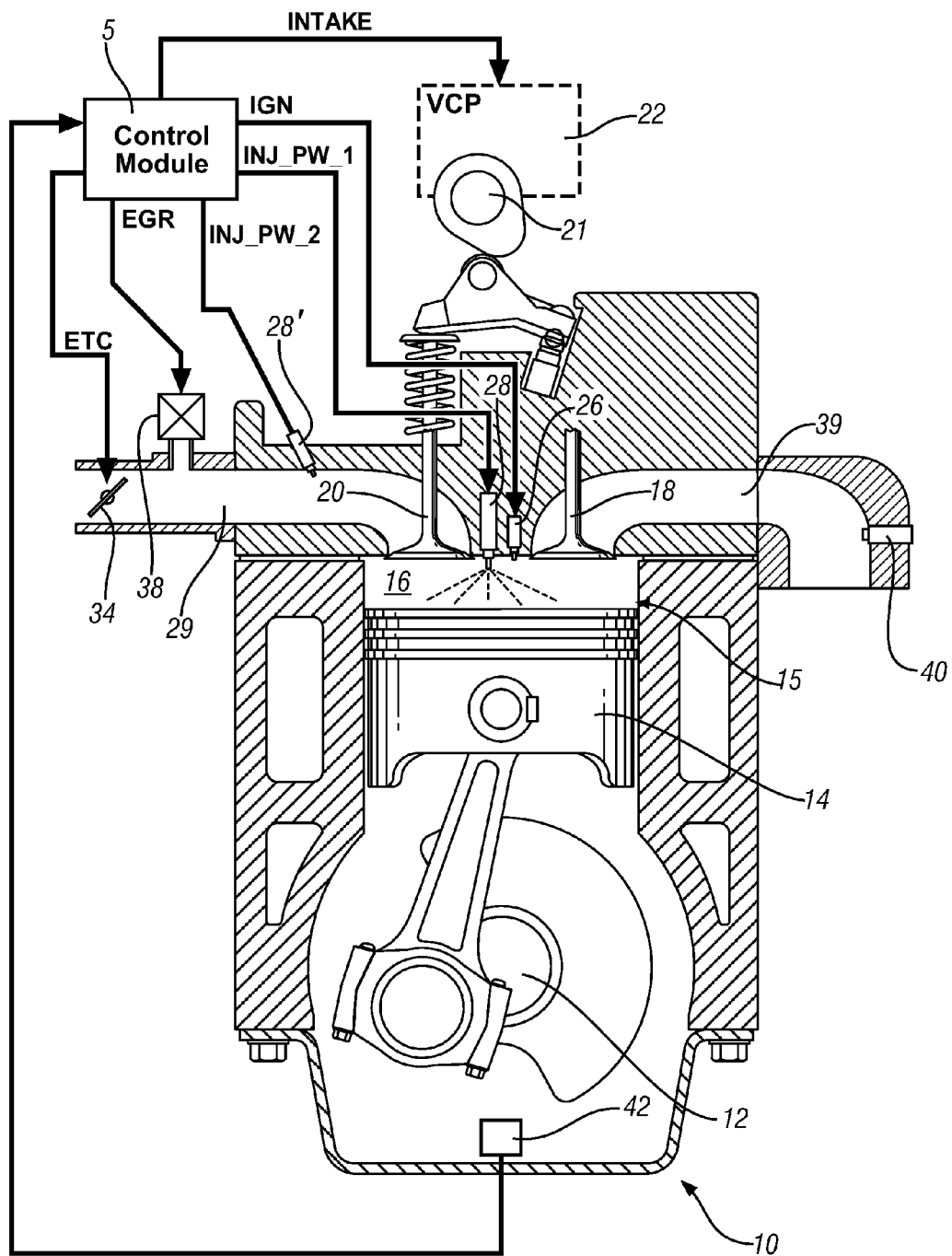
FIG. 1 schematically illustrates a single cylinder of an exemplary direct-injection compression-ignition engine, in accordance with the present disclosure.

Referring now to the drawings, wherein the showings are for the purpose of illustrating certain exemplary embodiments only and not for the purpose of limiting the same, FIG. 1 schematically illustrates a single cylinder of a direct-injection spark-assisted compression-ignition engine 10 and an accompanying control module 5 that have been constructed in accordance with an embodiment of the disclosure. Those skilled in the art will recognize that the present disclosure may be applied to multi-cylinder compression-ignited engines. The engine 10 may operate in a plurality of combustion modes, including a premix charge compression ignition (PCCI) combustion mode, and a compression ignition combustion mode. The engine 10 primarily operates at a lean air/fuel ratio, and is configured to operate at a geometric compression ratio greater than 10:1. The disclosure can be applied to various internal combustion engine systems and combustion cycles. For example, in one embodiment, the engine is operated in a spark-assisted compression-ignition combustion mode as described herein below for all speed/load engine operating points.

In one embodiment the engine 10 can be coupled to a transmission device to transmit tractive power to a driveline of a vehicle. The transmission can include a hybrid transmission including torque machines operative to transfer tractive power to a driveline.

The exemplary engine 10 includes a direct-injection four-stroke internal combustion engine having reciprocating piston 14 slidably movable in a cylinder 15 which define a variable volume combustion chamber 16. In one embodiment, the piston 14 may include a variable compression ratio piston controllable by the control module 5 to adjust compression ratios. The piston 14 is connected to a rotating crankshaft 12 by which linear reciprocating motion is translated to rotational motion. An air intake system provides intake air to an intake manifold 29 which directs and distributes air into an intake runner of the combustion chamber 16. The air intake system includes airflow ductwork and devices for monitoring and controlling the airflow. A throttle valve 34 preferably includes an electronically controlled device that is used to control airflow to the engine 10 in response to a control signal (ETC) from the control module 5. An external flow passage recirculates exhaust gases from an exhaust manifold 39 to the intake manifold 29, having a flow control valve referred to as an exhaust gas recirculation (EGR) valve 38. The control module 5 is configured to control mass flow of exhaust gas to the intake manifold 29 by controlling opening of the EGR valve 38.

Airflow from the intake manifold 29 into the combustion chamber 16 is controlled by one or more intake valve(s) 20. Exhaust flow out of the combustion chamber 16 is controlled by one or more exhaust valve(s) 18 to the exhaust manifold 39. The engine 10 is equipped with systems to control and adjust openings and closings of the intake and exhaust valves 20 and 18. In one embodiment, the openings and closings of the intake valve 20 can be controlled and adjusted by controlling an intake variable cam phasing (VCP) device 22. The intake VCP device 22 is configured to control phasing of an intake camshaft 21. The rotation of the intake camshaft 21 is linked to and indexed to rotation of the crankshaft 12, thus linking openings and closings of the intake valve 20 to positions of the crankshaft 12 and the piston 14.

The intake VCP device 22 preferably includes a mechanism that variably adjusts and controls phasing of the intake camshaft 21 in response to a control signal (INTAKE) from the control module 5. The intake VCP device 22 preferably includes a variable cam phasing (VCP) mechanism to control and adjust phasing (i.e., relative timing) of opening and closing of the intake valve 20. Adjusting the phasing refers to shifting opening times of the intake valve 20 relative to positions of the crankshaft 12 and the piston 14. The VCP mechanism of the intake VCP device 22 preferably has a range of phasing authority of about 60°-90° of crank rotation, thus permitting the control module 5 to advance or retard opening and closing of the intake valve 20 relative to position of the piston 14. The range of phasing authority is defined and limited by the intake VCP device 22. The intake VCP device 22 includes camshaft position sensors to determine rotational positions of the intake camshaft 21. The VCP device 22 is actuated using one of electro-hydraulic, hydraulic, and electric control force, controlled by the control module 5.

The engine 10 includes a fuel injection system, including one or more high-pressure fuel injectors 28 each configured to directly inject a mass of fuel into the combustion chamber 16 in response to a signal (INJ_PW_1) from the control module 5. The fuel injectors 28 are supplied pressurized fuel from a fuel distribution system. In one embodiment, a second fuel injector 28' may be included in the intake manifold 29 and configured to inject fuel into the intake manifold 29 in response to a signal (INJ_PW_2) from the control module 5 thereby increasing premixing of the injected fuel and intake air charge.

The engine 10 includes a spark-ignition system by which spark energy can be provided to a spark discharge device 26 for igniting or assisting in igniting cylinder charges in the combustion chamber 16 in response to a signal (IGN) from the control module 5. As used herein, a spark discharge device 26 means a spark plug, glow plug, or other igniter device known in the art and configured to induce combustion through heat addition into the combustion chamber. As used herein, spark discharge means heat addition from the spark discharge device 26.

The engine 10 is equipped with various sensing devices for monitoring engine operation, including a crank sensor 42 having output RPM and operative to monitor crankshaft rotational position, i.e., crank angle and speed, in one embodiment a combustion sensor configured to monitor combustion, and an exhaust gas sensor 40 configured to monitor exhaust gases, e.g., an air/fuel ratio sensor. The combustion sensor includes a sensor device operative to monitor a state of a combustion parameter, e.g., a cylinder pressure sensor operative to monitor in-cylinder combustion pressure. The output of the combustion sensor and the crank sensor 42 are monitored by the control module 5 to determine combustion phasing, i.e., timing of combustion pressure relative to the crank angle of the crankshaft 12 for the cylinder 15 for each combustion cycle. The combustion sensor can also be monitored by the control module 5 to determine a mean effective pressure, e.g., IMEP, for each cylinder 15 for each combustion cycle. Preferably, the engine 10 and control module 5 are mechanized to monitor and determine states of IMEP for each of the engine cylinders 15 during each cylinder firing event. Alternatively, other sensing systems can be used to monitor states of other combustion parameters within the scope of the disclosure, e.g., ion-sense ignition systems, and non-intrusive cylinder pressure sensors.

The control module 5 may take any suitable form including various combinations of one or more Application Specific Integrated Circuit(s) (ASIC), electronic circuit(s), central processing unit(s) (preferably microprocessor(s)) and associated memory and storage (read only, programmable read only, random access, hard drive, etc.) executing one or more software or firmware programs, combinational logic circuit (s), input/output circuit(s) and devices, appropriate signal conditioning and buffer circuitry, and other suitable components to provide the described functionality. The control module has a set of control algorithms, including resident software program instructions and calibrations stored in memory and executed to provide the desired functions. The algorithms are preferably executed during preset loop cycles. Algorithms are executed, such as by a central processing unit, and are operable to monitor inputs from sensing devices and other networked control modules, and execute control and diagnostic routines to control operation of actuators. Loop cycles may be executed at regular intervals, for example each 3.125, 6.25, 12.5, 25 and 100 milliseconds during ongoing engine and vehicle operation. Alternatively, algorithms may be executed in response to occurrence of an event.

In operation, the control module 5 monitors inputs from the aforementioned sensors to determine states of engine parameters. The control module 5 is configured to receive input signals from an operator (e.g., via a throttle pedal and a brake pedal) to determine an operator torque request. The control module 5 monitors the sensors indicating the engine speed, intake air temperature, coolant temperature and other ambient conditions.

The control module 5 executes algorithmic code stored therein to control the aforementioned actuators to form the cylinder charge, including controlling throttle valve position, spark discharge timing, fuel injection mass and timing, EGR valve position to control flow of recirculated exhaust gases, and intake and/or exhaust valve timing and phasing on engines so equipped. Valve timing and phasing can include negative valve overlap (NVO) and lift of exhaust valve reopening (in an exhaust re-breathing strategy) in one embodiment. The control module 5 can operate to turn the engine 10 on and off during ongoing vehicle operation, and in multi-cylinder engines can operate to selectively deactivate a portion of the combustion chambers 16 or a portion of the intake and exhaust valves 20 and 18 through control of fuel and spark and valve deactivation. The control module 5 can control air/fuel ratio based upon feedback from the exhaust gas sensor 40.

Figure 2:
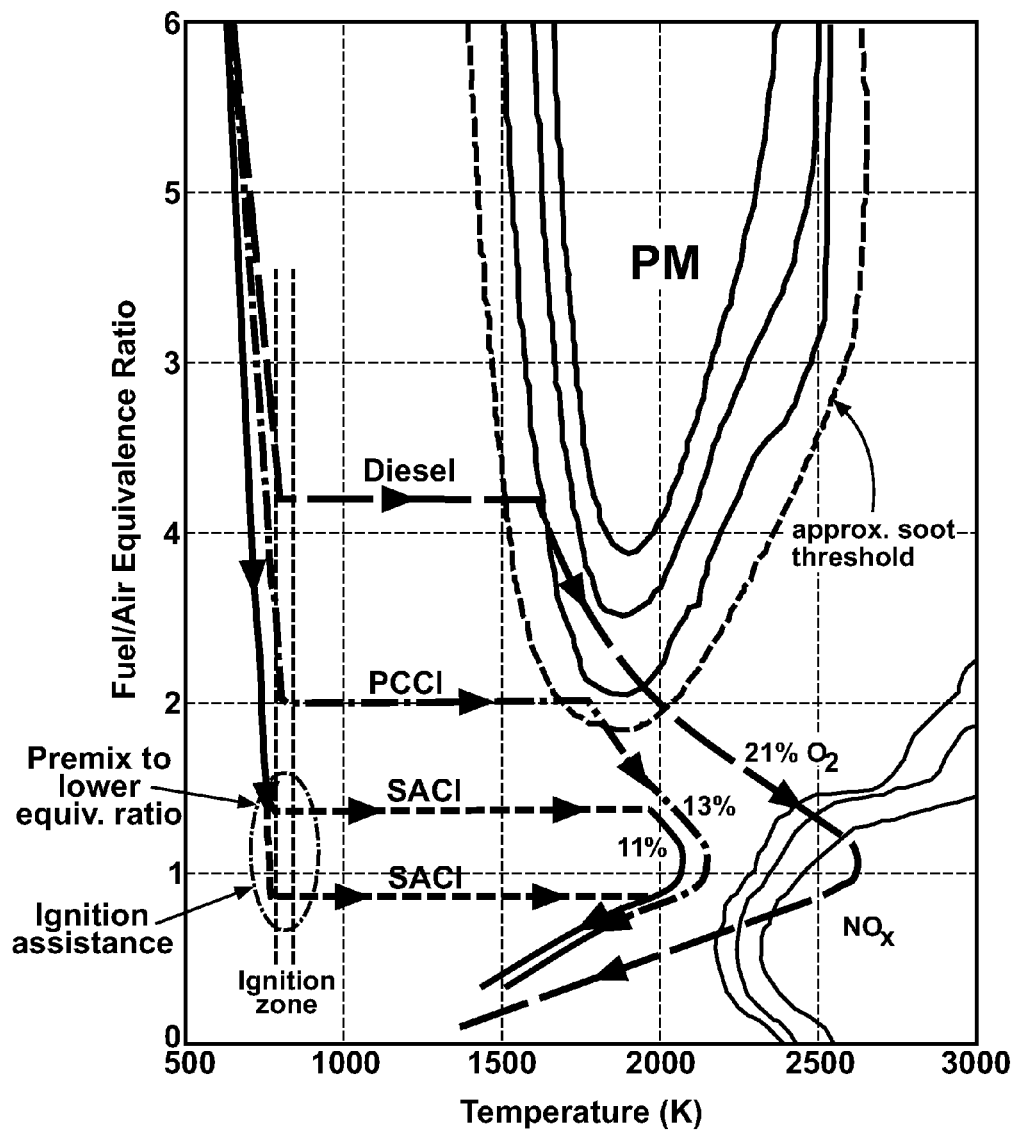
FIG. 2 graphically illustrates bulk temperature of a fuel/air charge associated with a fuel/air equivalence ratio for various combustion modes using the direct-injection compression-ignition engine, in accordance with the present disclosure.

FIG. 2 graphically illustrates bulk temperature of a fuel/air charge associated with a fuel/air equivalence ratio for various combustion modes including the spark-assisted compression-ignition combustion mode (SACI). The bulk temperature results were experimentally determined using the exemplary direct-injection compression-ignition engine. As one skilled in the art will recognize the fuel/air equivalence ratio is inversely related to an air/fuel ratio. FIG. 2 depicts regions of engine operation whereat combustion produces increased quantities of particulate matter (PM) and regions of engine operation where combustion produces increased quantities of NOx emissions (NOx). Various NOx thresholds are depicted as lines of constant NOx production located toward relatively lean engine operation (e.g. Fuel/Air Equivalence Ratio <2) at relatively high bulk temperatures of the fuel/air charge (>2100 K). An approximate soot threshold (approx. soot threshold) is depicted whereat particulate matter is initially produced during combustion and other various particulate matter/soot thresholds are depicted as lines of constant particulate matter production. Relatively high particulate matter is produced at combinations of higher fuel/air equivalence ratios (e.g. >1.8) at moderate-to-high bulk temperatures of the fuel/air charge (e.g. 1400-2600 K) giving rise to the characteristic U-shaped lines of constant particulate matter production. Therefore, the engine 10 preferably operates at low bulk temperatures of the fuel/air charge and relatively low fuel/air equivalence ratios, i.e., lean air/fuel ratios to achieve low particulate matter emissions and low NOx emissions. One skilled in the art understands that acceptable particulate matter and NOx emission thresholds and regions of operation may be determined or set in accordance with various considerations including, for example, regional emission standards. As one skilled in the art will recognize, further NOx reduction can be achieved by reducing oxygen presence in the combustion chamber 16.

Known diesel engine applications operate at relatively high combustion temperatures. Higher temperature operation during a compression-ignition combustion mode (Diesel) results from combustion executed at higher oxygen concentrations in the fuel/air charge, e.g., 21%, during combustion. The higher temperature operation results in increased particulate matter and NOx emissions, as depicted in FIG. 2. Compression-ignition engines operating in the premix-charge compression-ignition combustion mode (PCCI) have lower oxygen concentrations in the fuel/air charge, e.g., 13%, during combustion. The decreasing temperatures of the fuel/air charge reduce particulate matter formation and NOx emissions production. Compression-ignition engines operating in the spark-assisted compression-ignition combustion mode (SACI) have lower oxygen concentrations in the fuel/air charge, e.g., 11%, during combustion.

Included in FIG. 2 are experimental results from operating an exemplary engine in a first embodiment of the spark-assisted compression-ignition combustion mode whereat the fuel/air charge is premixed to a fuel/air equivalence ratio greater than 1:1 and a second embodiment of the spark-assisted compression-ignition combustion mode whereat the fuel/air charge is premixed to a fuel/air equivalence ratio less than 1:1. Engine operation associated with the decreased temperatures of the fuel/air charge correspond to decreased NOx emissions and decreased particulate matter production.

A spark-assisted auto-ignition combustion mode is characterized by a fuel injection event and a subsequent spark discharge in the combustion chamber 16 to assist auto-ignition of a fuel/air charge. The method includes forming the fuel/air charge by injecting a fuel pulse into the combustion chamber 16, preferably during a compression stroke, operating the engine 10 to manage temperature of the fuel/air charge in the combustion chamber 16 below the auto-ignition point, and controlling the spark discharge device 26 to discharge spark in the combustion chamber 16 subsequent to injecting the fuel pulse and in advance of the fuel/air charge achieving an auto-ignition temperature.

During engine operation in the spark-assisted compression-ignition combustion mode, the throttle valve 34 is preferably substantially wide-open. Substantially wide-open throttle can include operating fully un-throttled, or slightly throttled to create enough vacuum in the intake manifold 29 to effect a desired EGR flow. In one embodiment, in-cylinder EGR mass is controlled to a high dilution rate, e.g., greater than 40% of cylinder air charge. One or more fuel injection events can be executed during the combustion cycle to form a fuel/air charge including at least one injection during the compression stroke as described herein below.

Figure 3:
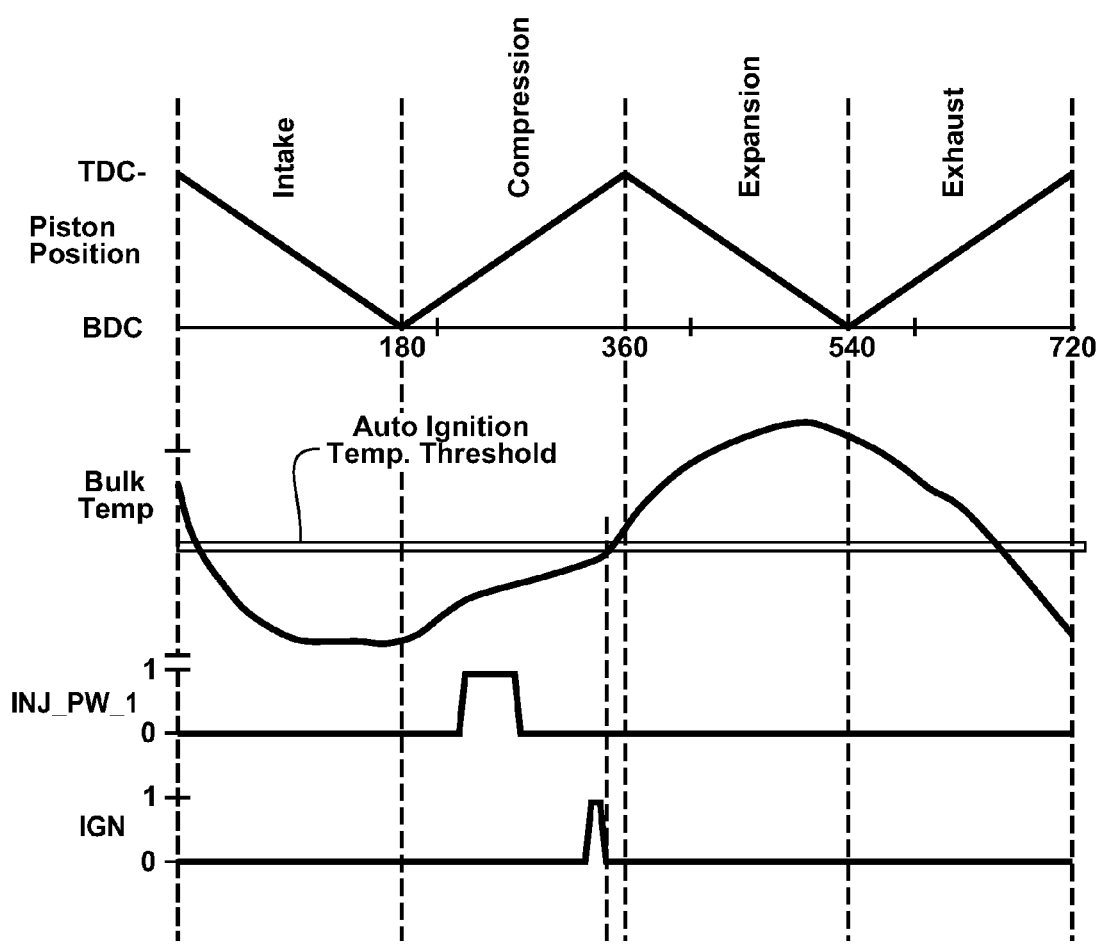
FIG. 3 graphically illustrates states of engine operating parameters during an engine combustion cycle, in accordance with the present disclosure.

FIG. 3 graphically illustrates states of engine operating parameters during an exemplary combustion cycle for the spark-assisted auto-ignition combustion mode. During engine operation, the engine 10 repetitively executes a four-stroke combustion cycle including intake, compression, expansion, and exhaust strokes.

The intake stroke of the piston 14 is characterized by opening of the intake valve 20, causing movement of an air charge into the combustion chamber 16, between top-dead-center (TDC) and bottom-dead-center (BDC). During the intake stroke of the piston 14, the intake valve 20 is controlled to an open position permitting airflow from the intake manifold 29 and recirculated exhaust gas from the EGR valve 38 to enter the combustion chamber 16. Opening and closing phasing of the intake valve 20 may be adjusted using the intake VCP device 22. In one embodiment, fuel may be metered and injected into the combustion chamber 16 during the intake stroke thereby increasing time for the fuel and air to mix before combustion. Alternatively, in engines equipped with the second fuel injector 28' the fuel may be injected into the intake manifold 29 during the intake stroke thereby increasing mixing of the injected fuel and the intake air charge.

The compression stroke of the piston 14 is characterized by compression of the fuel/air charge in the combustion chamber 16 before combustion and occurs between BDC and TDC. The intake valve 20 and the exhaust valve 18 are closed during compression of the fuel/air charge. For increased engine efficiency, the intake valve 20 can be closed immediately subsequent to BDC during the compression stroke. Closing of the intake valve 20 can be delayed to manage temperature of the fuel/air charge below the auto-ignition point as a result of controlling an effective compression ratio. The effective compression ratio is defined as a ratio of a volumetric displacement of the combustion chamber 16 at closing of the intake valve 20 and a minimum volumetric displacement of the combustion chamber 16, e.g., when the piston 14 is at TDC. The geometric compression ratio is defined as a ratio of a maximum volumetric displacement of the combustion chamber 16 occurring at BDC and the minimum volumetric displacement of the combustion chamber 16 occurring at TDC without regard to closing time of the intake valve 20. A delayed closing of the intake valve 20 traps less air in the combustion chamber 16, thus decreasing pressure and therefore temperature in the combustion chamber 16 during combustion. In one embodiment, fuel is metered and injected into the combustion chamber 16 during the compression stroke. Preferably, one fuel injection event is executed to inject fuel; however, multiple fuel injection events may be executed. In one embodiment, fuel is injected early enough in the compression stroke to allow adequate premixing of the fuel/air charge in the combustion chamber 16. In this embodiment the end of injection should occur preferably no later than 10 degrees ATDC and more preferably no later than TDC and before the spark plug ignites the fuel. If multiple fuel injection events are to be executed, the end of the last injection should occur preferably no later than 10 degrees ATDC and more preferably no later than TDC and before the spark plug ignites the fuel. Premixing is understood to mean substantial homogeneity of the fuel/air charge. One having ordinary skill in the art understands that injection timing in the compression stroke may desirably be advanced for example at higher engine speed to allow for adequate premixing to occur. In fact, as mentioned herein above, fuel may be metered and injected into the combustion chamber 16 during the intake stroke thereby increasing time for the fuel and air to mix. Preferably, the premixed fuel/air charge equivalence ratio is below 2:1. More preferably, the premixed fuel/air charge equivalence ratio is below 1:1.

The expansion stroke of the piston 14 is characterized by a combustion event whereby the fuel/air charge auto-ignites and forces the piston 14 downward with the intake and exhaust valves 20 and 18 in closed positions. Preferably, an effective expansion ratio for combustion is determined based upon in-cylinder thermal properties and physical durability of the engine 10 to maximize engine fuel efficiency.

The exhaust stroke of the piston 14 is characterized by release of exhaust gases created by the combustion event into an exhaust gas feedstream. The exhaust occurs between BDC and TDC. The products of combustion, or exhaust gases, are forced from the combustion chamber 16 by the piston 14, past the open exhaust valve 18 and into the exhaust manifold 39. From there, the exhaust gases may enter the EGR passage or flow to the aftertreatment system 70.

As FIG. 3 shows, fuel is injected into the combustion chamber 16 by the fuel injector 28 during the compression stroke. The temperature in-cylinder is less than the auto-ignition temperature threshold. As the fuel/air charge in the combustion chamber 16 is compressed the temperature in the combustion chamber 16 increases to slightly less than the auto-ignition temperature threshold. Subsequent to injecting the fuel pulse and in advance of the fuel/air charge achieving the auto-ignition temperature, the spark discharge device 26 is controlled to discharge spark in the combustion chamber 16.

The control module 5 signals the spark discharge device 26 to discharge a spark into the combustion chamber 16. Preferably, the spark is discharged after a predetermined elapsed time period subsequent to fuel injection to allow the injected fuel to mix with the intake air inside the combustion chamber 16. The discharged spark ignites a portion of the fuel/air charge, increasing the fuel/air charge temperature in excess of the auto-ignition temperature threshold, thereby causing the remaining unignited portion of the fuel/air charge to auto-ignite. After auto-ignition, bulk temperature recedes to less than the auto-ignition temperature threshold.

Temperature of the fuel/air charge in the combustion chamber 16 can be managed below the auto-ignition point using one or more of multiple techniques. A first technique includes varying closing timing of the intake valve 20 by controlling phasing. Delaying closing of the intake valve 20 decreases the air charge trapped in the combustion chamber 16 and reduces the effective compression ratio thereby reducing bulk temperature of the fuel/air charge. Closing timing of the intake valve 20 may be determined based upon in-cylinder conditions including temperature. Preferably, the effective compression ratio is between about 6:1 and about 10:1. A second technique for managing temperature of the fuel/air charge below the auto-ignition point includes varying the effective compression ratio by adjusting a variable compression ratio piston, on engines so equipped. Decreasing the effective compression ratio reduces pressure during the compression stroke and therefore reduces bulk temperature of gases in the combustion chamber 16. A third technique for managing temperature of the fuel/air charge below the auto-ignition point includes controlling the EGR valve 38 to control mass flow of exhaust gas to the intake manifold 29 and into the combustion chamber 16. Increasing recirculated exhaust gas quantities increases the temperature of gases in the combustion chamber 16 upon closing the intake valve 20, but decreases overall bulk temperature.

The abovementioned methods may be used while operating in a premixed-charge compression-ignition combustion mode. In the premixed-charge compression-ignition combustion mode, a relatively high rate of preferably aggressively cooled EGR gas is controlled to the intake manifold 29. The EGR gas flows into the combustion chamber 16 during the intake stroke and is compressed during the compression stroke. Fuel is injected during the compression stroke—and completed prior to any combustion—to allow premixing of the fuel with the intake air and EGR gas before the start of combustion. The premixed nature of combustion along with the high EGR rate prevents the formation of the locally rich areas of high temperature whereat particulate emissions are formed. The relatively high EGR rate reduces in-cylinder temperature and thus reduces NOx formation during combustion in the combustion chamber 16.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. A method for operating a compression-ignition internal combustion engine comprising a plurality of combustion chambers operating in a four-stroke combustion cycle and configured to operate at a geometric compression ratio greater than 10:1, the method comprising:
   operating the engine in a spark-assisted compression-ignition combustion mode for all speed/load engine operating points, comprising:
      forming a fuel/air charge by injecting a first quantity of fuel into each combustion chamber during a compression stroke, said injecting being completed prior to any combustion within the combustion chamber;
      operating the engine to manage temperature of the fuel/air charge in the combustion chamber below an auto-ignition point of the fuel/air charge; and
      providing a spark discharge in the combustion chamber subsequent to injecting the first quantity of fuel and in advance of the fuel/air charge achieving an auto-ignition temperature.

2. The method of claim 1, wherein operating the engine to manage temperature of the fuel/air charge in the combustion chamber comprises:
   controlling an exhaust gas recirculation valve to recirculate exhaust gases from an engine exhaust to an intake manifold.

3. The method of claim 1, wherein operating the engine to manage temperature of the fuel/air charge in the combustion chamber comprises:
   controlling a variable compression ratio piston.

4. The method of claim 1, wherein operating the engine to manage temperature of the fuel/air charge in the combustion chamber comprises:
   controlling phasing of a variable cam phasing system configured to control opening and closing of an intake valve.

5. The method of claim 1, wherein forming a fuel/air charge by injecting fuel into each combustion chamber during a compression stroke comprises:
   injecting the fuel into each combustion chamber early enough in the compression stroke to provide premixing of the fuel with intake air.

6. The method of claim 5 wherein the fuel/air charge has a fuel/air equivalence ratio of less than 2.

7. The method of claim 6 wherein the fuel/air equivalence ratio is less than 1.

8. The method of claim 1, further comprising injecting a second quantity of fuel into each combustion chamber late in the intake stroke.

9. The method of claim 5, wherein providing the spark discharge in the combustion chamber occurs after a predetermined elapsed time period subsequent to injecting the first quantity of fuel.

10. The method of claim 1, further comprising:
    injecting a second quantity of fuel into an intake manifold during an intake stroke.

11. The method of claim 1, wherein the spark discharge in the combustion chamber ignites a portion of the fuel/air charge increasing fuel/air charge temperature sufficient to cause a remaining portion of the fuel/air charge to auto-ignite.

12. The method of claim 11, wherein the auto-ignited remaining portion of the fuel/air charge comprises a major portion of the fuel/air charge that is combusted during said auto-ignition.

13. The method of claim 1, further comprising:
    operating the engine outside of predetermined regions of engine operation defined by bulk temperatures of the fuel/air charge and fuel/air equivalence ratios whereat combustion produces particulate matter in excess of a predetermined particulate matter threshold and NOx emissions in excess of a predetermined NOx threshold.

14. A method for operating a compression-ignition internal combustion engine comprising a plurality of combustion chambers operating in a four-stroke combustion cycle and configured to operate at a geometric compression ratio greater than 10:1, the method comprising:
    operating the engine in a spark-assisted compression-ignition combustion mode for all speed/load engine operating points, comprising:
    injecting a fuel pulse into each combustion chamber early enough in the compression stroke to premix the fuel pulse with intake air to establish a premixed fuel/air charge;
    controlling phasing of a variable cam phasing system configured to control opening and closing of an intake valve to establish an effective compression ratio between about 10:1 and 6:1 whereby temperature of the premixed fuel/air charge remains below an auto-ignition point of the fuel/air charge; and
    providing a spark discharge in the combustion chamber subsequent to injecting the fuel pulse to ignite a portion of the premixed fuel/air charge sufficient to increase the premixed fuel/air charge temperature to the auto-ignition point.

15. The method of claim 14 wherein the premixed fuel/air charge has a fuel/air equivalence ratio of less than 2.

16. The method of claim 15 wherein the fuel/air equivalence ratio is less than 1.

* * * * *